Dec. 24, 1940.  A. J. FREEMAN  2,225,694
FOOD MARKING AND REINFORCING
Original Filed March 4, 1935  2 Sheets-Sheet 1
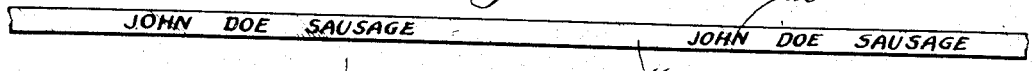
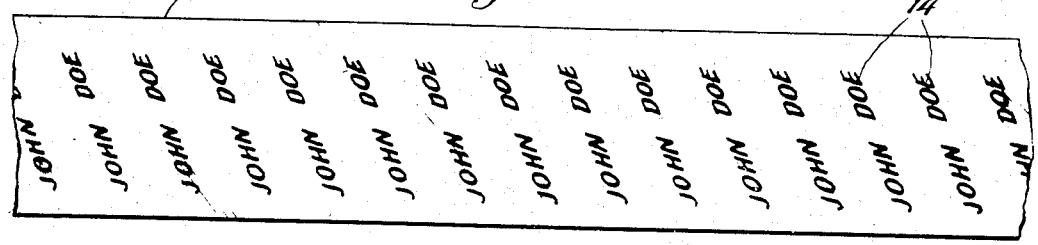
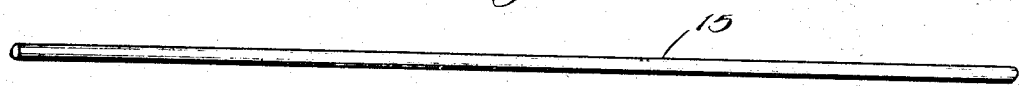
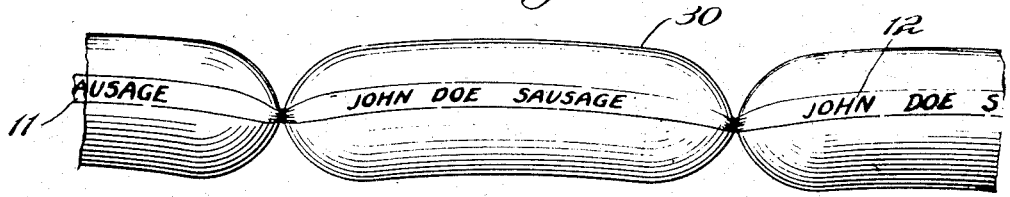
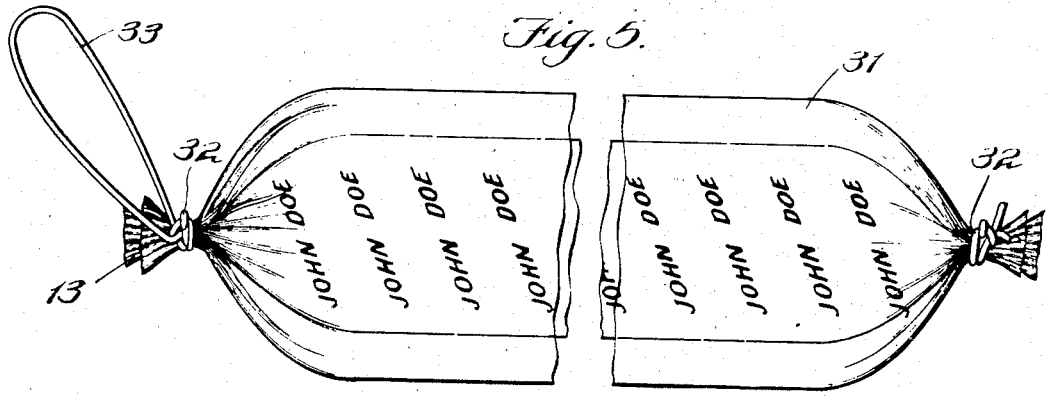
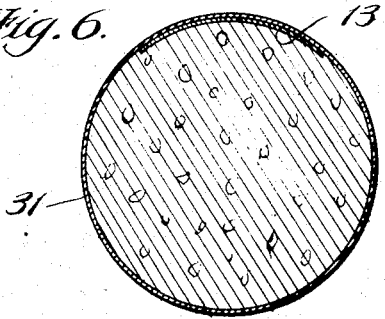
INVENTOR.
Alpheus J. Freeman
BY Glenn S. Noble
ATTORNEY.

Dec. 24, 1940.                A. J. FREEMAN                 2,225,694
                        FOOD MARKING AND REINFORCING
                   Original Filed March 4, 1935     2 Sheets-Sheet 2
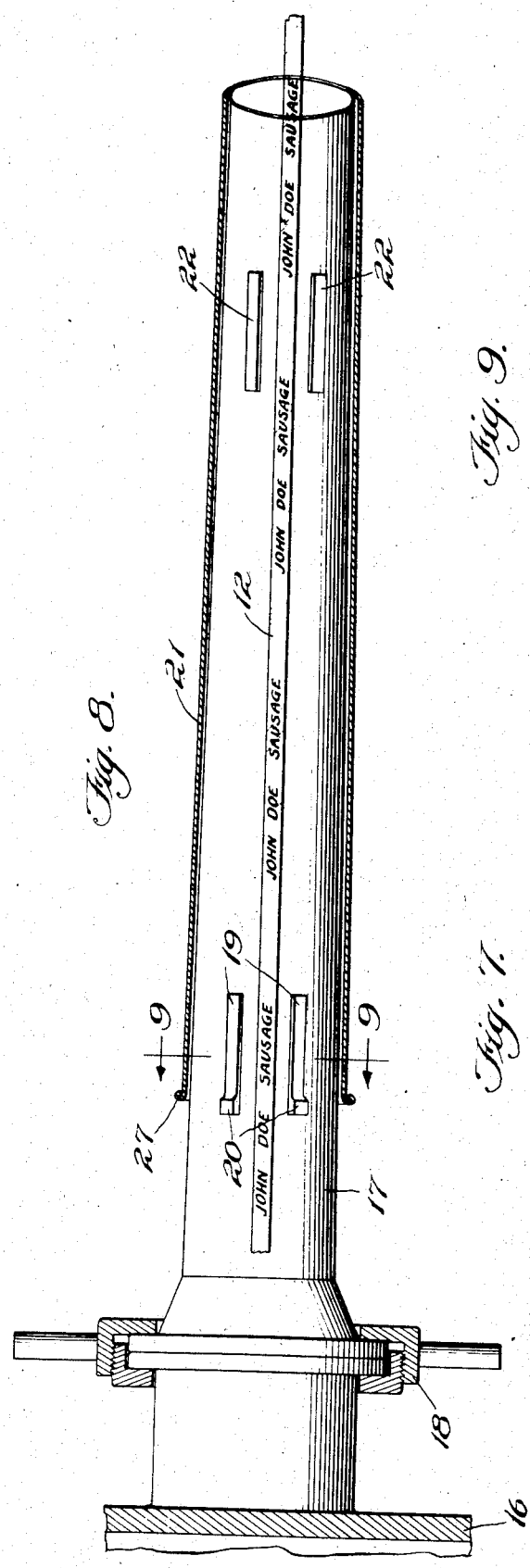
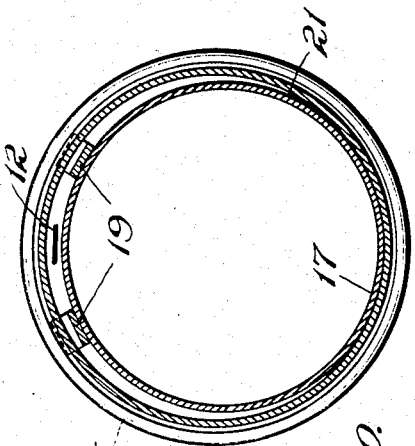
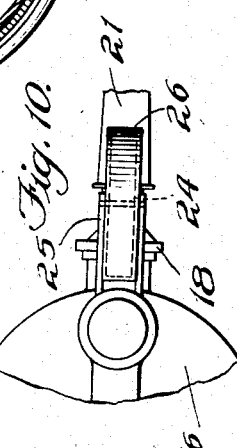
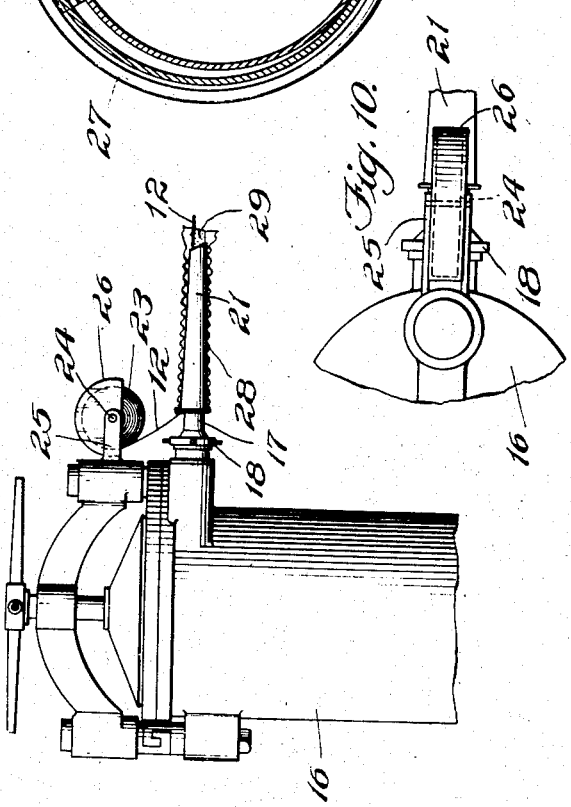
INVENTOR.
Alpheus J. Freeman
BY Glenn S. Noble
ATTORNEY.

Patented Dec. 24, 1940

2,225,694

UNITED STATES PATENT OFFICE 2,225,694

FOOD MARKING AND REINFORCING

Alpheus J. Freeman, Chicago, Ill., assignor to Freeman, Incorporated, Chicago, Ill., a corporation of Illinois Application March 4, 1935, Serial No. 9,282
Renewed May 18, 1940

8 Claims. (Cl. 99—175)

This application is in part a continuation of my co-pending application Serial No. 689,105, filed September 12, 1933.

There are a large variety of various meat products such as sausages, "wienerwursts," "hot dogs," cheese and other foods which are commonly stuffed in casings. The skins or casings most commonly used are of animal origin, which has been found preferable to artificial casings. However, such skins or casings, which are usually made from the intestines of various animals, are frequently fragile or weak and do not have sufficient strength to support the weight after they have been stuffed. This necessitates the discarding of considerable quantities of casings or if such casings of insufficient strength are used there is apt to be a considerable loss after the sausage or other product has been manufactured. This occurs largely when the linked sausages or bungs are hung in the drying or smoking room. Frequently strings of sausages will fall to the floor and necessitate the discarding of the same.

Heretofore, as far as I am aware, no satisfactory method has been provided for properly marking such food products, and particularly sausages or food in natural casings, to designate the manufacturer or to show the origin of the same. This has resulted in a large amount of substitutions of inferior products for those of reputable manufacturers.

The present invention is directed to means for reinforcing food products, and particularly the casings containing the same, and also to provide means whereby the products may be marked or labeled with novel indicating means which cannot be erased or removed therefrom without destroying the goods. The invention also includes the method of applying such reinforcement for marking such products and to suitable mechanism or means for carrying out the process.

The objects of this invention, as above indicated, are to provide novel means for reinforcing food products, particularly those enclosed in casings; to provide means adapted to be inserted in casings for food products to label the same, or to indicate the manufacturer or source of origin; to provide an improved method of applying reinforcing or indicating strips to sausages or other food products in casings; and to provide an improved machine for inserting the indicating strips or reinforcing members in the casings as they are being stuffed.

Other objects and advantages will appear from the following description taken in connection with the accompanying drawings illustrating this invention, in which Figure 1 is a view showing one form of indicating or reinforcing strip;

Figure 2 is a view showing another form of strip;

Figure 3 is a view showing another form of strip or member which may comprise a cord formed of any suitable material such as string or formed of edible or alimentary material such as used for making spaghetti or the like;

Figure 4 is a side view showing links of sausage or frankfurters with my marking applied thereto;

Figure 5 is a side view of a sausage of larger diameter such as commonly stuffed in bungs with the ends tied;

Figure 6 is a cross sectional view of the form shown in Figure 5;

Figure 7 is a side view showing the stuffing machine embodying my improvements for applying the reinforcing or marking material to the inside of the casings as the casings are being filled;

Figure 8 is an enlarged sectional detail showing a filler horn to be used in carrying out my improved method of marking or reinforcing;

Figure 9 is an enlarged sectional view taken on the line 9—9 of Figure 8; and

Figure 10 is a detail view showing the reel or spool for the strips to be applied to the casings.

Figures 1, 2 and 3 illustrate in general strips, cords, or inserts of paper, vegetable parchment, or of any suitable edible or non-edible material which may be utilized for marking or reinforcement or combined marking and reinforcing of food products, such as sausages or the like. The flat strip 11 illustrated in Figure 1 is preferably made comparatively narrow as of approximately one-quarter inch width and has the trade mark or trade name of the manufacturer applied thereto as indicated at 12, such mark being repeated at frequent intervals so that it will be plainly visible when applied to the goods. The strip 13 shown in Figure 2 is wider than the strip shown in Figure 1 and the trade mark or identifying mark is preferably arranged diagonally thereto as shown at 14 and repeated at frequent intervals. This wider strip is intended to be used with sausages or the like of larger diameter.

A string or cord 15 as shown in Figure 3, may also be utilized, such cord alone serving to identify the goods or it may be colored or formed in different designs for such purpose. While such strips or strings may be made of any material suitable for the purposes indicated, they may preferably be made of transparent edible product of a cellulose nature, and the wider ones made of paper or vegetable parchment, such product being printed with edible ink or marking material so that when applied to the goods it will not be detrimental and will also pass Government inspection. These strips, tapes, cords or strings not only serve for reinforcing the casings and identifying the goods, but may also be used in some instances for ripping open the casing when the sausage is to be eaten.

While my improved reinforcing or marking devices may be applied in any suitable manner, I have shown a stuffing machine in Figures 7 to 10 constructed for the purpose of applying such devices. The stuffing machine or stuffer 16 is illustrative of any machines ordinarily used for this purpose and is provided with a filler horn 17 which is detachably secured to the outlet of the machine by means of the usual coupling 18. These horns are made in various sizes, depending upon the nature of the sausage to be manufactured or food to be stuffed in casings and marked in accordance with the present invention. The horn 17 is provided adjacent to the inner end with two spacers or elongated lugs 19 having stops or shoulders 20. These spacers are preferably wedge shaped or tapered to provide a friction fit or engagement with an auxiliary or outer horn 21 which is similar in shape to the horn 17. Other spacers 22 are arranged in alignment with the respective spacers 19 and serve to hold the corresponding portion of the outer horn in spaced relation to the inner horn as will be seen from Figures 8 and 9. This provides a track or passageway between the horns for the tape or marking material such as the strip 12, which may be fed therethrough into the casing as will presently be described.

The tape or marking material is preferably provided in a roll 23 which is carried on a spool or roller 24 in a bracket 25 secured to the upper portion of the stuffer as shown in Figure 7. A cap or housing 26 is preferably provided to protect the roll of material 23. The strip 12 is carried from the reel down into the space between the two horns, being guided by the rolled end 27 of the outer horn 21 and passing out between the guides or spacers 19 and 22 and its outer or free end is left projecting a short distance beyond the ends of the horns preparatory for the filling operation. The casing 28 as shown in Figure 7, is gathered on the outer horn in the same manner as it would ordinarily be arranged on the regular horn preparatory for filling. When the sausage meat or filling material 29 begins to emerge from the inner horn, it carries the marking strip 12 along therewith and presses it closely against the inner surface of the casing as it is being filled, the casing of course sliding off from the outer horn in the usual manner during the stuffing operation.

If the product being manufactured is of the linked type such as pork sausage, the casing is run out and filled in the usual manner and the links then formed therein by twisting, resulting in sausages 30 such as shown in Figure 4. In sausages of this kind the marking and reinforcing strip is continued throughout the length of the connected links and serves to reinforce the same so that the sausage casings are not apt to be broken at the joints or to fall down when being hung up for storage, smoking or the like.

If bungs or large casings are to be filled, the operation is the same as described with the exception that after the bung has been filled the ends are gathered together and tied by strings 32 in the usual manner. One of these strings is usually provided with a loop 33 for hanging the same to be smoked or dried. In this form of sausage as shown in Figure 5, the marking strip such as 13, is preferably carried out through the gathered ends of the casing and tied therein, thus reinforcing the casing. The portion of the marking and reinforcing strip 13 will in this instance also be pressed closely against the casing 31 as shown in Figure 6. The passageway for the strip or insert such as shown at 13 keeps such strip dry during the stuffing operation and the stuffing material will force the same smoothly against the inner surface of the wet casing.

While I have shown and described herein an improved marking device for sausages or the like, together with an improved method and machine for applying the same, it will be observed that changes may be made in the marking strips or devices and also in the method and machine, in order to adapt the same for various products or different conditions, and therefore I do not wish to be limited to the particular devices, method or apparatus herein shown and described, except as specified in the following claims, in which I claim:

1. The combination with a food product stuffed in a substantially transparent casing having gathered ends and having strings for tying said ends, of a marking member comprising a strip of paper with printing thereon enclosed in the casing and extending beyond said tied ends and having the printing in contact with the inner surface of the casing and held there-against by the food product therein.

2. The combination with a food product, including a casing and means for tying the ends of the casing, of a combined reinforcing and identifying strip vegetable fabric extending longitudinally of the casing and projecting beyond the tied portions, said strip being positioned against the casing and visible therethrough for the purposes described.

3. The method of marking food products in transparent casings which consists in inserting an identifying means in the casing in contact with the inner surface thereof and simultaneously filling the casing with the product, whereby the identifying means will be held against the casing by the enclosed product.

4. The method of reinforcing and marking sausages or the like, which consists in feeding an identifying and reinforcing strip into the casing as it is being stuffed, said strip being carried in and pressed against the wall of the casing by the material stuffed therein.

5. The process for the manufacture of marked and strengthened sausage in casings which consists in supporting the casing and a marking strip in juxtaposition with a portion of the strip arranged within the casing in position to be engaged by the sausage material, then introducing sausage material into the casing whereby the casing is drawn out and the marking strip is drawn into the casing and pressed against the inner wall of the casing substantially as described.

6. The method of marking sausages which consists in providing a stuffer horn with a guideway adjacent thereto and terminating adjacent to the end of the horn, then applying a casing to the horn for stuffing in the usual manner, and also providing a marking strip which extends through the guideway and into the casing, and finally forcing sausage through the stuffer horn into the casing and simultaneously drawing the marking strip into the casing and causing it to be pressed against the inner wall of the casing by the sausage.

7. An improved method of marking food products, stuffed in casings which consists in providing a horn having an adjacent guideway through which an identifying strip may be fed, arranging a continuous supply of identifying strip with a portion thereof extending through said guideway and placing a wet casing over the horn and guideway and then feeding the material through the horn into the casing and simultaneously feeding the dry strip into the casing between the material and the casing whereby the material will force the strip against the inner wall of the casing.

8. The combination with a sausage or the like comprising a substantially transparent bung casing with filling therein, of a wide strip of paper with printing thereon interposed between the bung and the filling with the printing next to the bung and extending longitudinally through the bung with its ends projecting out at the ends thereof and tying at the ends to form neck portions which include said strip, said strip also serving to reinforce the bung.

ALPHEUS J. FREEMAN.